(12) United States Patent
Kim et al.

(10) Patent No.: US 11,198,393 B2
(45) Date of Patent: Dec. 14, 2021

(54) METHOD AND APPARATUS FOR CALIBRATING A PLURALITY OF CAMERAS

(71) Applicant: VADAS Co., Ltd., Gyeongsangbuk-do (KR)

(72) Inventors: Hee Soo Kim, Gyeongsangbuk-do (KR); Jeong Mok Ha, Gyeongsangbuk-do (KR); Byeong Chan Jeon, Gyeongsangbuk-do (KR); Jun Seok Lee, Gyeongsangbuk-do (KR)

(73) Assignee: VADAS Co., Ltd., Gyeongsangbuk-do (KR)

( * ) Notice: Subject to any disclaimer, the term of this patent is extended or adjusted under 35 U.S.C. 154(b) by 0 days.

(21) Appl. No.: 16/908,744

(22) Filed: Jun. 23, 2020

(65) Prior Publication Data

US 2021/0001776 A1    Jan. 7, 2021

(30) Foreign Application Priority Data

Jul. 1, 2019 (KR) .......................... 10-2019-0078562

(51) Int. Cl.
*B60R 1/00* (2006.01)

(52) U.S. Cl.
CPC ........ *B60R 1/002* (2013.01); *B60R 2300/105* (2013.01); *B60R 2300/30* (2013.01); *B60R 2300/80* (2013.01)

(58) Field of Classification Search
None
See application file for complete search history.

(56) References Cited

U.S. PATENT DOCUMENTS

| | | | | |
|---|---|---|---|---|
| 9,834,153 B2 * | 12/2017 | Gupta | ...................... | B60R 11/04 |
| 10,297,034 B2 * | 5/2019 | Nash | .......................... | G06T 7/30 |
| 10,303,172 B2 * | 5/2019 | Hwang | ................. | B64C 39/024 |
| 10,654,423 B2 * | 5/2020 | Gupta | .................. | H04N 17/002 |
| 10,778,960 B2 * | 9/2020 | Grenier | ................ | H04N 13/243 |
| 10,919,458 B2 * | 2/2021 | Gupta | ..................... | B60R 11/04 |

(Continued)

FOREIGN PATENT DOCUMENTS

| | | | | |
|---|---|---|---|---|
| KR | 20180057029 A | * | 5/2018 | ............ G08G 1/056 |
| WO | 2015029934 | | 3/2015 | |

(Continued)

OTHER PUBLICATIONS

Zhang, "Flexible Camera Calibration by Viewing a Plane from Unknown Orientations," Microsoft Research, avaible from IEEE, 0-7695-0164-8/99, pp. 1-8 (Year: 1999).*

*Primary Examiner* — Reza Aghevli
(74) *Attorney, Agent, or Firm* — JCIPRNET

(57) ABSTRACT

A camera calibration method includes obtaining a plurality of images of surroundings of a vehicle captured by a plurality of cameras, setting a region of interest (ROI) in each of the images, detecting one or more feature points of the set ROIs, matching a first feature point of a first ROI and a second feature point of a second ROI based on the detected feature points, calculating a first bird-view coordinate of the first feature point and a second bird-view coordinate of the second feature point, and calibrating the cameras by adjusting an extrinsic parameter of each of the cameras based on an error between the first bird-view coordinate and the second bird-view coordinate.

11 Claims, 16 Drawing Sheets

(56) References Cited

U.S. PATENT DOCUMENTS

| | | | | |
|---|---|---|---|---|
| 2007/0255480 | A1* | 11/2007 | Southall | G06K 9/00825 |
| | | | | 701/96 |
| 2009/0228204 | A1* | 9/2009 | Zavoli | G01S 19/49 |
| | | | | 701/532 |
| 2014/0333729 | A1* | 11/2014 | Pflug | G06T 15/00 |
| | | | | 348/47 |
| 2014/0347486 | A1* | 11/2014 | Okouneva | H04N 5/247 |
| | | | | 348/148 |
| 2015/0049193 | A1* | 2/2015 | Gupta | G03B 43/00 |
| | | | | 348/148 |
| 2015/0329048 | A1* | 11/2015 | Wang | B60R 1/00 |
| | | | | 348/148 |
| 2017/0124781 | A1* | 5/2017 | Douillard | G08G 1/096816 |
| 2017/0323459 | A1* | 11/2017 | Ermilios | G06T 7/80 |
| 2018/0046188 | A1* | 2/2018 | Hwang | G06T 7/277 |
| 2018/0086284 | A1* | 3/2018 | Gupta | G03B 43/00 |
| 2018/0096487 | A1* | 4/2018 | Nash | G06T 3/0025 |
| 2019/0096057 | A1* | 3/2019 | Allen | G06T 7/0008 |
| 2019/0188495 | A1* | 6/2019 | Zhao | G06K 9/66 |
| 2019/0236794 | A1* | 8/2019 | Nash | G06T 5/002 |
| 2019/0295291 | A1* | 9/2019 | Raag | G06T 7/13 |
| 2019/0377349 | A1* | 12/2019 | van der Merwe | G06Q 50/12 |
| 2020/0218279 | A1* | 7/2020 | Liu | G06T 7/246 |
| 2020/0276939 | A1* | 9/2020 | Gupta | B60R 11/04 |
| 2020/0286244 | A1* | 9/2020 | Freeman-Powell | G06T 7/174 |
| 2020/0406897 | A1* | 12/2020 | Hartmann | G06K 9/6293 |

FOREIGN PATENT DOCUMENTS

| | | | | |
|---|---|---|---|---|
| WO | WO-2016204068 | A1 * | 12/2016 | G06F 3/1446 |
| WO | WO-2018087856 | A1 * | 5/2018 | G06T 3/00 |
| WO | WO-2019176930 | A1 * | 9/2019 | G06T 7/97 |

\* cited by examiner

Feature point extraction and matching

METHOD AND APPARATUS FOR CALIBRATING A PLURALITY OF CAMERAS

CROSS-REFERENCE TO RELATED APPLICATION(S)

This application claims the priority benefit of Korean Patent Application No. 10-2019-0078562 filed on Jul. 1, 2019, in the Korean Intellectual Property Office, the disclosure of which is incorporated herein by reference for all purposes.

BACKGROUND

1. Field

One or more example embodiments relate to a technology for calibrating cameras of a vehicle, and more particularly, to a technology for calibrating cameras of a vehicle while the vehicle is traveling.

2. Description of Related Art

As an image capturing and processing technology develops, recently produced vehicles are equipped with cameras, and a top view system that assists a driver or a user in driving a vehicle or assists a vehicle in traveling is provided to a user or a vehicle. The top view system may generate a top-view image or a bird's-eye view image (hereinafter simply "bird-view image") using a plurality of images captured by a plurality of cameras. The bird-view image may provide a driver with an elevated top view of a vehicle that is viewed from above, and thus contribute to completely removing a blind spot on a front side, a rear side, a left side, and/or a right side of the vehicle.

SUMMARY

An aspect provides a method and device for calibrating a plurality of cameras.

Another aspect provides a method and device for calibrating a plurality of cameras while a vehicle is traveling.

According to an example embodiment, there is provided a camera calibration method to be performed by a processor provided in a vehicle. The camera calibration method includes obtaining a plurality of images of surroundings of the vehicle captured by a plurality of cameras of the vehicle, setting a region of interest (ROI) in each of the images among which a first ROI of a first image and a second ROI of a second image include a common region, detecting one or more feature points of the set ROIs, matching a first feature point of the first ROI and a second feature point of the second ROI based on the detected feature points, calculating a first bird-view coordinate of the first feature point and a second bird-view coordinate of the second feature point, and calibrating the cameras by adjusting an extrinsic parameter of each of the cameras based on an error between the first bird-view coordinate and the second bird-view coordinate.

The cameras may include at least two of a left camera configured to capture an image of a left-side view from the vehicle, a right camera configured to capture an image of a right-side view from the vehicle, a front camera configured to capture an image of a front-side view from the vehicle, or a rear camera configured to capture an image of a rear-side view from the vehicle.

The extrinsic parameter of each of the cameras may include rotation information and position information of each of the cameras.

The feature points may be associated with an object on a road on which the vehicle is traveling.

When the first image is a front-side view image and the second image is a left-side view image, the setting of the ROI in each of the images may include setting the ROI in each of the images such that the first ROI includes a leftmost side of the front-side view image and the second ROI includes a rightmost side of the left-side view image.

The camera calibration method may further include generating partial images by cropping the set ROIs. The detecting of the feature points of the ROIs may include detecting the one or more feature points of the ROIs based on the generated partial images.

When the number of matching feature points of the first ROI and the second ROI is greater than or equal to a preset number, the calculating of the first bird-view coordinate of the first feature point and the second bird-view coordinate of the second feature point may include calculating the first bird-view coordinate and the second bird-view coordinate.

The calibrating of the cameras may include calculating a first error between the first bird-view coordinate and the second bird-view coordinate, and adjusting an extrinsic parameter of at least one of the cameras such that the first error is minimized.

When the extrinsic parameter of the at least one of the cameras is adjusted, the calculating of the first bird-view coordinate of the first feature point and the second bird-view coordinate of the second feature point may include calculating a first adjusted bird-view coordinate of the first feature point and a second adjusted bird-view coordinate of the second feature point based on the adjusted extrinsic parameter. The calibrating of the cameras may include calculating a first adjusted error between the first adjusted bird-view coordinate and the second adjusted bird-view coordinate.

When the first error is less than a preset threshold value, the calibrating of the cameras may further include terminating the calibrating of the cameras.

According to another example embodiment, there is provided an electronic device provided in a vehicle to calibrate a plurality of cameras. The electronic device includes a memory in which a program of calibrating the cameras is recorded, and a processor configured to perform the program. The program may include obtaining a plurality of images of surroundings of the vehicle captured by the cameras of the vehicle, setting an ROI in each of the images among which a first ROI of a first image and a second ROI of a second image include a common region, detecting one or more feature points of the set ROIs, matching a first feature point of the first ROI and a second feature point of the second ROI based on the detected feature points, calculating a first bird-view coordinate of the first feature point and a second bird-view coordinate of the second feature point, and calibrating the cameras by adjusting an extrinsic parameter of each of the cameras based on an error between the first bird-view coordinate and the second bird-view coordinate.

The cameras may include at least two of a left camera configured to capture an image of a left-side view from the vehicle, a right camera configured to capture an image of a right-side view from the vehicle, a front camera configured to capture an image of a front-side view from the vehicle, or a rear camera configured to capture an image of a rear-side view from the vehicle.

The extrinsic parameter of each of the cameras may include rotation information and position information of each of the cameras.

The feature points may be associated with an object on a road on which the vehicle is traveling.

When the first image is a front-side view image and the second image is a left-side view image, the setting of the ROI in each of the images may include setting the ROI in each of the images such that the first ROI includes a leftmost side of the front-side view image and the second ROI includes a rightmost side of the left-side view image.

The program may further include generating partial images by cropping the set ROIs. The detecting of the feature points of the ROIs may include detecting the feature points of the ROIs based on the generated partial images.

When the number of matching feature points of the first ROI and the second ROI is greater than or equal to a preset number, the calculating of the first bird-view coordinate of the first feature point and the second bird-view coordinate of the second feature point may include calculating the first bird-view coordinate and the second bird-view coordinate.

The calibrating of the cameras may include calculating a first error between the first bird-view coordinate and the second bird-view coordinate, and adjusting an extrinsic parameter of at least one of the cameras such that the first error is minimized.

When the extrinsic parameter of the at least one of the cameras is adjusted, the calculating of the first bird-view coordinate of the first feature point and the second bird-view coordinate of the second feature point may include calculating a first adjusted bird-view coordinate of the first feature point and a second adjusted bird-view coordinate of the second feature point based on the adjusted extrinsic parameter. The calibrating of the cameras may include calculating a first adjusted error between the first adjusted bird-view coordinate and the second adjusted bird-view coordinate.

When the first error is less than a preset threshold value, the calibrating of the cameras may include terminating the calibrating of the cameras.

According to still another example embodiment, there is provided a camera calibration method to be performed by a processor provided in a vehicle. The camera calibration method includes obtaining a plurality of images of surroundings of the vehicle captured by a plurality of cameras of the vehicle, determining a partial region of each of the images based on an ROI that is set in advance with respect to a bird's eye viewpoint, generating a plurality of partial bird-view images by transforming the determined partial regions by the bird's eye viewpoint, in which a first partial bird-view image among the partial bird-view images corresponds to a first ROI and a second partial bird-view image among the partial bird-view images corresponds to a second ROI and the first ROI and the second ROI include a common region, detecting a first feature point of the first partial bird-view image and a second feature point of the second partial bird-view image, matching the first feature point and the second feature point, and calibrating the cameras by adjusting an extrinsic parameter of each of the cameras based on an error between a first bird-view coordinate of the first feature point and a second bird-view coordinate of the second feature point.

The cameras may include at least two of a left camera configured to capture an image of a left-side view from the vehicle, a right camera configured to capture an image of a right-side view from the vehicle, a front camera configured to capture an image of a front-side view from the vehicle, or a rear camera configured to capture an image of a rear-side view from the vehicle.

When the number of matching feature points of the first partial bird-view image and the second partial bird-view image is greater than or equal to a preset number, the calibrating of the cameras by adjusting the extrinsic parameter of each of the cameras based on the error between the first bird-view coordinate of the first feature point and the second bird-view coordinate of the second feature point may include calibrating the cameras.

The calibrating of the cameras by adjusting the extrinsic parameter of each of the cameras based on the error between the first bird-view coordinate of the first feature point and the second bird-view coordinate of the second feature point may include calculating a first error between the first bird-view coordinate and the second bird-view coordinate, and adjusting an extrinsic parameter of at least one of the cameras such that the first error is minimized.

According to yet another example embodiment, there is provided an electronic device provided in a vehicle to calibrate a plurality of cameras. The electronic device includes a memory in which a program of calibrating the cameras is recorded, and a processor configured to perform the program. The program may include obtaining a plurality of images of surroundings of the vehicle captured by the cameras of the vehicle, determining a partial region of each of the images based on an ROI that is set in advance with respect to a bird's eye viewpoint, generating a plurality of partial bird-view images by transforming the determined partial regions by the bird's eye viewpoint, in which a first partial bird-view image among the partial bird-view images corresponds to a first ROI and a second partial bird-view image among the partial bird-view images corresponds to a second ROI and the first ROI and the second ROI include a common region, detecting a first feature point of the first partial bird-view image and a second feature point of the second partial bird-view image, matching the first feature point and the second feature point, and calibrating the cameras by adjusting an extrinsic parameter of each of the cameras based on an error between a first bird-view coordinate of the first feature point and a second bird-view coordinate of the second feature point.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
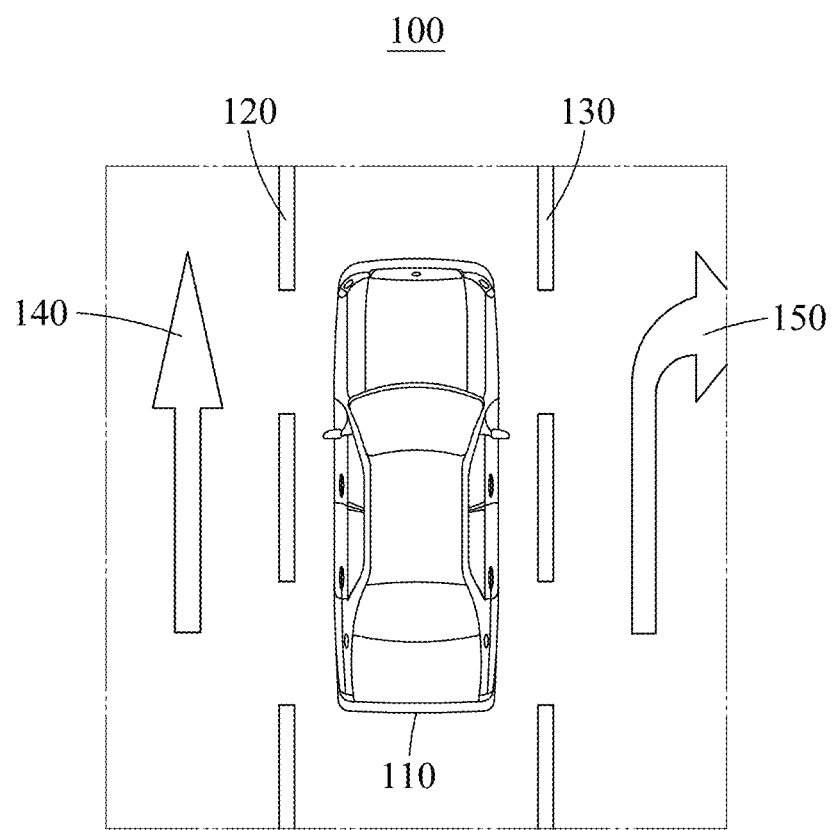
FIG. 1 is a diagram illustrating an example of a bird-view image of a vehicle according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof. Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of a bird-view image of a vehicle according to an example embodiment.

To generate an elevated top view or a bird's eye view image (hereinafter simply "bird-view image") of a vehicle, it needs to merge a plurality of images captured by a plurality of cameras of the vehicle. To merge the images, it needs to match coordinate systems of the images. That is, it needs to generate partial bird-view images by transforming the coordinate systems of the images into a common coordinate system that is set in advance for the vehicle, and generate a final bird-view image by merging the generated partial bird-view images. Here, a partial bird-view image may be generated by warping an image, for example. The generated final bird-view image may be used for an around view monitor (AVM). The term "bird-view image" used herein may refer to an image captured from a bird's eye viewpoint.

In the example of FIG. 1, a generated bird-view image 100 may be an image of a vehicle 110 that is captured from a bird's eye viewpoint. In this example, the bird-view image 100 may not include an image of the vehicle 110. Alternatively, the bird-view image 100 may include a preset image of the vehicle 110 that is not an actually captured image of the vehicle 110. The bird-view image 100 may include a left line 120 on a left side of the vehicle 110, a right line 130 on a right side of the vehicle 110, a first marking 140, and a second marking 150. The bird-view image 100 may further include a guardrail on a road, for example.

However, due to an error occurring when installing a camera in a vehicle, it may not be possible in reality to completely match coordinate axes of cameras to a common coordinate system. Although it may be possible to precisely calibrate a camera installation error at a factory that produces a vehicle, the camera installation error may change or occur constantly after the vehicle is released because an installation position of a camera in the vehicle changes by a physical force, for example, impact and twisting occurring while the vehicle is traveling. Thus, to generate an accurate bird-view image, a plurality of cameras of a vehicle may need to be calibrated on a periodic basis or each time an impact occurs.

To merge a plurality of images, it needs to perform camera calibration to correct such a camera installation error first. For the camera calibration, information including, for example, a height and an angle at which a camera is installed, may be required. To obtain such information for the camera calibration, an existing method that installs a certain reference pattern such as a checkerboard on the ground and obtains camera information using a pattern image of the checkerboard captured by cameras of a vehicle has been used.

The existing method may obtain precise camera information because an accurate relative position of a certain marker such as a pattern may be obtained in advance. However, to perform the method, such a certain pattern may need to be installed around a vehicle. In addition, the method may not be performed while the vehicle is traveling.

In a case of a general vehicle, a camera installation error may occur on a periodic basis or each time an impact occurs due to an actual movement of the vehicle, and thus camera calibration may need to be automatically performed even while the vehicle is traveling. The camera calibration performed while a vehicle is traveling may be referred to as on-road calibration (ORC).

When the calibration is performed only using a line on a road, it is possible to estimate only rotation information of extrinsic parameters of a camera. The extrinsic parameters may include rotation information and position information. For example, when only the rotation information is estimated while the position information is set as an inaccurate value, the estimated rotation information may be inaccurate as a result.

The rotation information may be estimated as a more inaccurate value to correct the position information set as an inaccurate value, and thus other portions excluding lines on a road may not be matched although the lines are well matched.

Thus, all patterns on a road, in addition to lines, may be used for more accurate camera calibration. The patterns on the road may include patterns drawn in colors different from those indicating lanes on the road to convey information to drivers, for example, lines, speed limit markings, left and right direction markings, and children protection zones. The reasons for using the patterns may be that most of the patterns are on the road and on the ground, and thus the patterns indicate same points in a bird-view image, and the patterns have distinctive feature points.

Hereinafter, a method of calibrating a plurality of cameras, simply referred to herein as a camera calibration method, will be described in detail with reference to FIGS. 2 through 13.

Figure 2:
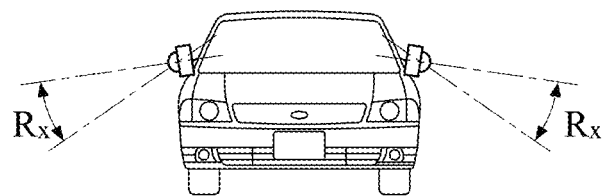
FIGS. 2 and 3 are diagrams illustrating examples of rotation information and position information of extrinsic parameters of cameras according to an example embodiment.
Figure 2:
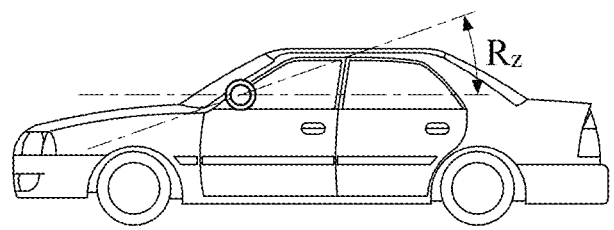
Figure 2:
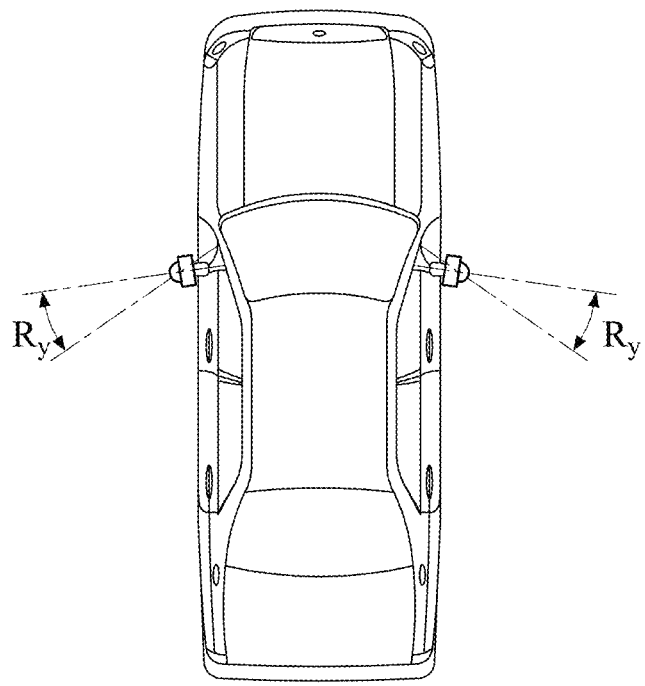
Figure 3:
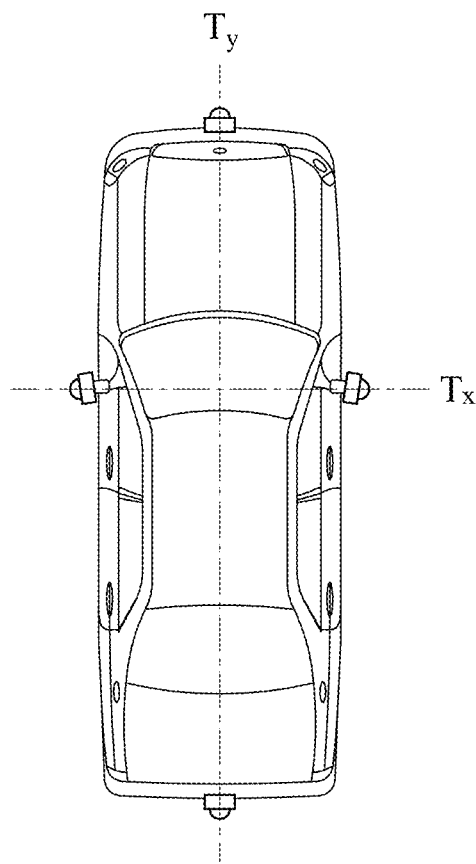
Figure 3:
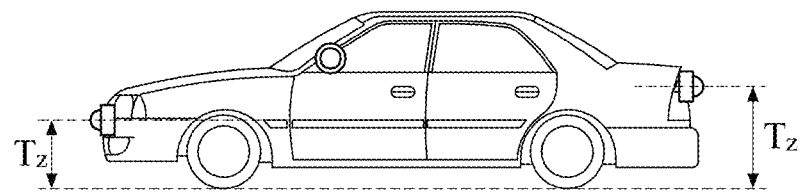

FIGS. 2 and 3 are diagrams illustrating examples of rotation information and position information of extrinsic parameters of cameras according to an example embodiment.

To calibrate cameras, extrinsic parameters of the cameras may need to be corrected or calibrated. The extrinsic parameters may include rotation information and position information of the cameras.

In the example of FIG. 2, an upper portion 210 illustrates a pitch (Rx) of a camera, a middle portion 220 illustrates a roll (Rz) of the camera, and a lower portion 230 illustrates a yaw (Ry) of the camera.

In the example of FIG. 3, an upper portion 310 and a lower portion 320 illustrate position information (Tx, Ty, and Tz). The position information may be set based on a position of a vehicle. For example, a world coordinate system in which a certain position of the vehicle is set as a reference point may be set in advance, and position information of cameras may be represented by the world coordinate system.

Figure 4:
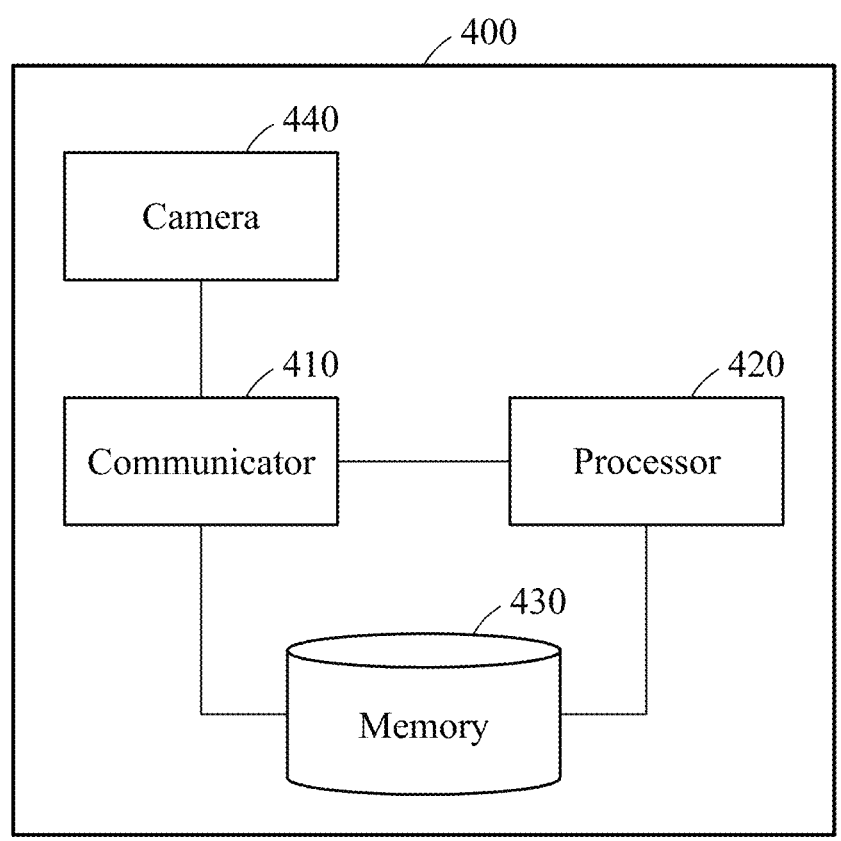
FIG. 4 is a diagram illustrating an example of an electronic device configured to calibrate a plurality of cameras according to an example embodiment.

FIG. 4 is a diagram illustrating an example of an electronic device configured to calibrate a plurality of cameras according to an example embodiment.

Referring to FIG. 4, an electronic device 400 includes a communicator 410, a processor 420, a memory 430, and a camera 440. The electronic device 400 may be provided in a vehicle. For example, the electronic device 400 may be a device such as an electronic control unit (ECU). For another example, the electronic device 400 may be an independent device connected to an ECU.

The communicator 410 may be connected to the processor 420, the memory 430, and the camera 440 to transmit and receive data. The communicator 410 may be connected to another external device to transmit and receive data thereto and therefrom. Hereinafter, the expression "transmit and receive A" will indicate transmitting and receiving information or data indicating A.

The communicator 410 may be embodied as a circuitry in the electronic device 400. For example, the communicator 410 may include an internal bus and an external bus. For another example, the communicator 410 may be an element that connects the electronic device 400 and an external device. The communicator 410 may be an interface. The communicator 410 may receive data from the external device and transmit the received data to the processor 420 and the memory 430.

The processor 420 may process the data received by the communicator 410 and data stored in the memory 430. The processor 420 may be a data processing device that is embodied by hardware having a circuit of a physical structure to execute desired operations. The desired operations may include, for example, a code or instructions included in a program. The data processing device embodied by hardware may include, for example, a microprocessor, a central processing unit (CPU), a processor core, a multi-core processor, a multiprocessor, an application-specific integrated circuit (ASIC), and a field-programmable gate array (FPGA).

The processor 420 may execute a computer-readable code, for example, software, that is stored in the memory 430, and instructions derived by the processor 420.

The memory 430 may store the data received by the communicator 410 and data processed by the processor 420. For example, the memory 430 may store a program, for example, an application and software. The program to be stored may be a set of syntaxes that is coded to calibrate cameras by adjusting extrinsic parameters of the cameras and is executable by the processor 420.

The memory 430 may include at least one volatile memory, nonvolatile memory, random-access memory (RAM), flash memory, hard disk drive, and optical disc drive.

The memory 430 may store a set of instructions that operates the electronic device 400, for example, software. The set of instructions that operates the electronic device 400 may be executed by the processor 420.

The camera 440 may generate an image by capturing a scene. The camera 440 may include a plurality of cameras. For example, the cameras may be installed on a front side, a rear side, a left side, and a right side of the vehicle.

Hereinafter, the communicator 410, the processor 420, the memory 430, and the camera 440 will be described in detail with reference to FIGS. 5 through 13.

Figure 5:
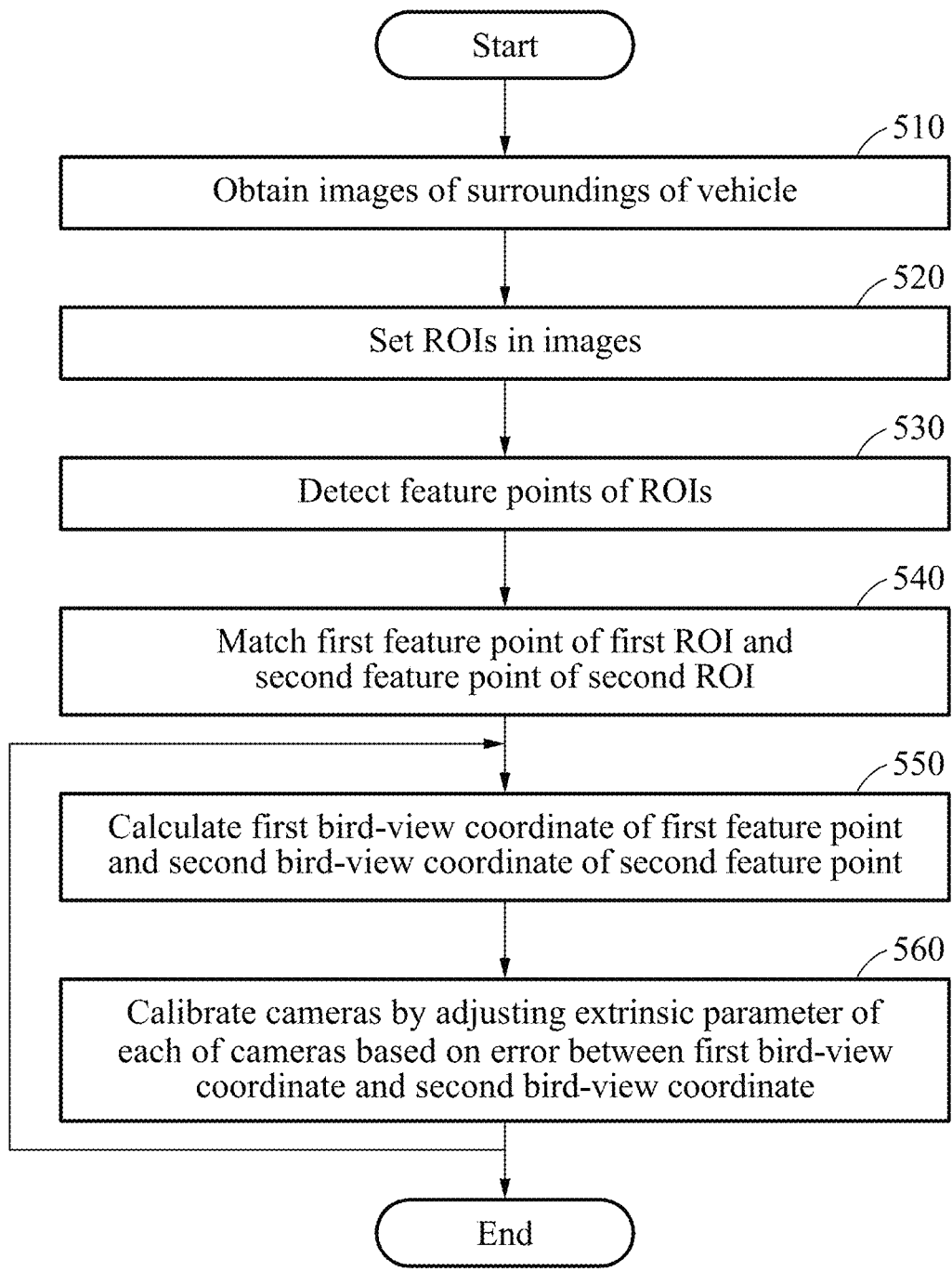
FIG. 5 is a flowchart illustrating an example of a method of calibrating a plurality of cameras according to an example embodiment.

FIG. 5 is a flowchart illustrating an example of a method of calibrating a plurality of cameras according to an example embodiment. The method of calibrating a plurality of cameras may also be referred to herein simply as a camera calibration method.

Operations 510 through 560 to be described hereinafter with reference to FIG. 5 may be performed by the electronic device 400 described above with reference to FIG. 4.

Referring to FIG. 5, in operation 510, the electronic device 400 obtains a plurality of images of surroundings of a vehicle. For example, the electronic device 400 may obtain the images captured using the camera 440. To detect feature points of a pattern present at a same time and a same position, the images may be captured at a same capturing time. The pattern may indicate an object on a road.

The camera 440 may include a wide-angle lens having a greater viewing angle than a general lens, or a fish-eye lens which is a super-wide-angle lens having a viewing angle of 180 degrees (°) or greater. For example, using such a lens having a great viewing angle to generate an image, it is possible to capture an image of all the surroundings of the vehicle.

For example, when the camera 440 includes four cameras that capture respectively an image of a front-side view from the vehicle, an image of a rear-side view from the vehicle, an image of a left-side view from the vehicle, and an image of a right-side view from the vehicle, and camera calibration is performed based on the images captured by the four cameras, an extrinsic parameter of each of the cameras may be estimated. For example, a pitch (Rx), a yaw (Ry), and a roll (Rz) may be estimated as rotation information of a camera. For another example, translation information (Tx, Ty) and height information (Tz) may be estimated as position information of a camera.

In this example, when the camera 440 includes the four cameras that capture the images of the front-side view, the rear-side view, the left-side view, and the right-side view of the vehicle, four channels may be defined for each of the cameras.

For example, when there is a pattern on a road that is captured simultaneously by at least two of the cameras, the pattern may need to indicate a same position in images that are transformed by a bird's eye viewpoint. In this example, when an extrinsic parameter of each of the four cameras is accurate, the pattern may be indicated as a single one in a bird-view image. However, when the extrinsic parameter is not accurate, the pattern may be indicated as a plurality of patterns.

Thus, it is possible to estimate an accurate extrinsic parameter of each of the cameras. Hereinafter, a method of estimating an accurate extrinsic parameter using obtained images will be described in detail.

In operation 520, the electronic device 400 sets a region of interest (ROI) in each of the images. The ROI may be a portion of an image that overlaps another image. Thus, for example, a first ROI of a first image among the images and a second ROI of a second image among the images may include a common region. In this example, when the first image is a front-side view image and the second image is a left-side view image, the first ROI of the first image and the second ROI of the second image may be at a position indicating an upper left end of the vehicle. The ROI will be described hereinafter in detail with reference to FIGS. 6 and 7.

In operation 530, the electronic device 400 detects one or more feature points of the set ROIs. For example, the electronic device 400 may detect feature points of the first ROI and feature points of the second ROI. The electronic device 400 may detect feature points of the pattern present on the road. For example, the feature points may include a feature point of a line on the road, a feature point of a direction marking, and the like. To detect the feature points, a scale-invariant feature transform (SIFT) algorithm, a speeded-up robust feature (SURF) algorithm, a Haar algorithm, a Ferns algorithm, and an oriented features from accelerated segment test (FAST) and rotated binary robust independent elementary features (BRIEF) (ORB) algorithm may be used. However, examples are not limited to the example algorithms described in the foregoing.

In operation 540, the electronic device 400 matches a first feature point of the first ROI and a second feature point of the second ROI. For example, a feature point of an ROI of a front-side view image may match a feature point of an ROI of a left-side view image, the feature point of the ROI of the front-side view image may match a feature point of an ROI of a right-side view image, a feature point of an ROI of a rear-side view image may match the feature point of the ROI of the left-side view image, and the feature point of the ROI of the rear-side view image may match the feature point of the ROI of the right-side view image.

In operation 550, the electronic device 400 calculates a first bird-view coordinate of the first feature point and a second bird-view coordinate of the second feature point. For example, when the first feature point is a feature point of a front-side view image and the second feature point is a feature point of a left-side view image, the electronic device 400 may calculate the first bird-view coordinate of the first feature point based on an extrinsic parameter of a front camera and calculate the second bird-view coordinate of the second feature point based on an extrinsic parameter of a left camera. The term "bird-view coordinate" described herein may indicate coordinates in a coordinate system of a bird-view image to be generated. For example, the coordinate system of the bird-view image may be a world coordinate system described above.

As a prerequisite for performing operation 550, whether the number of matching feature points is greater than or equal to a preset number may be determined after operation 540 is performed. For example, when the number of matching feature points of the first ROI and the second ROI is greater than or equal to the preset number, the first bird-view coordinate and the second bird-view coordinate may be calculated. As the number of the matching feature points of the first ROI and the second ROI increases, it is possible to estimate a more accurate extrinsic parameter.

However, when the number of the matching feature points of the first ROI and the second ROI is less than the preset number, accuracy in adjusting the extrinsic parameter may not be guaranteed. Thus, the extrinsic parameter may not be adjusted for a plurality of current images, for example, current frames.

In operation 560, the electronic device 400 calibrates the cameras by adjusting the extrinsic parameter of each of the cameras based on an error between the first bird-view coordinate and the second bird-view coordinate.

When the cameras are not accurately calibrated, different world coordinate systems may be generated for the cameras. Thus, to replace an accurate world coordinate system, a position of a neighboring camera adjacent to a target camera may be used. For example, the camera calibration may be performed by transforming the position of the neighboring camera into a position of the target camera, and setting the transformed position as a reference point of the world coordinate system. Using such a method described in the foregoing, the camera calibration may be performed using the reference point even though an accurate reference point of the world coordinate system is not known, and it may thus be possible to adjust the extrinsic parameter.

However, when an extrinsic parameter of the neighboring camera is inaccurate, the set reference point of the world coordinate system may also be an inaccurate position. Thus, a method of repeatedly performing the camera calibration on each of the cameras, not performing the camera calibration once on one camera, may be used to gradually reduce an error of the extrinsic parameter. As described above, by setting a reference point of a world coordinate system of each target camera while changing the target camera, and performing repeatedly the camera calibration using the set reference point of the world coordinate system, it is possible to calibrate a plurality of cameras simultaneously.

Hereinafter, the camera calibration method will be described in greater detail with reference to FIGS. 8 through 13.

Figure 6:
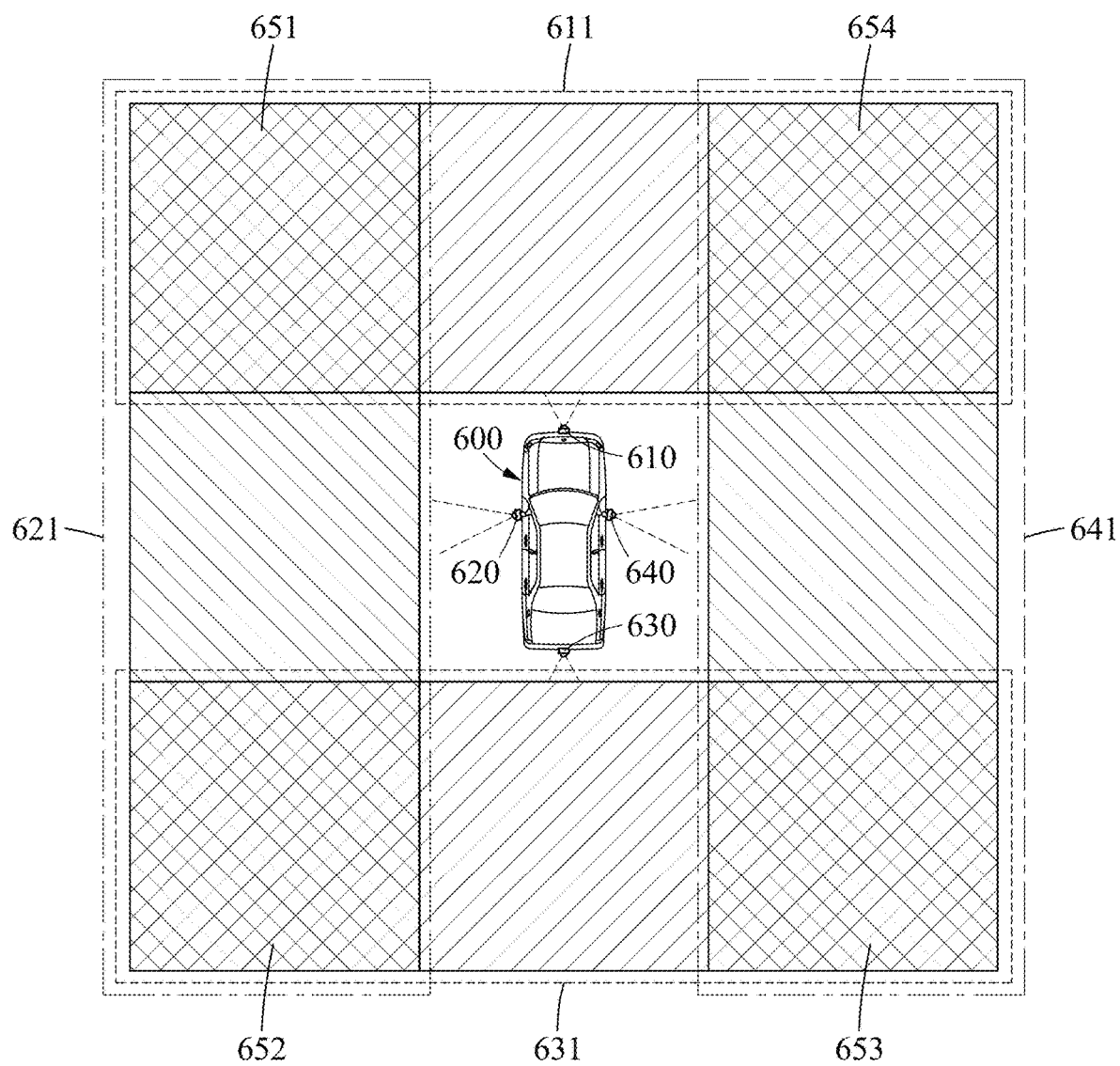
FIG. 6 is a diagram illustrating examples of regions of interest (ROIs) according to an example embodiment.

FIG. 6 is a diagram illustrating examples of ROIs according to an example embodiment.

Referring to FIG. 6, a first image 611 may be a front-side view image generated by a front camera 610, or a first partial bird-view image generated based on the front-side view image. A second image 621 may be a left-side view image generated by a left camera 620, or a second partial bird-view image generated based on the left-side view image. A third image 631 may be a rear-side view image generated by a rear camera 630, or a third partial bird-view image generated based on the rear-side view image. A fourth image 641 may be a right-side view image generated by a right camera 640, or a fourth partial bird-view image generated based on the right-side view image.

The images 611, 621, 631, and 641 are provided as examples to describe ROIs around a vehicle 600. Thus, whether the images 611, 621, 631, and 641 are images generated by cameras or transformed partial bird-view images is not limited to the examples described in the foregoing.

A first ROI may be set such that the first ROI includes at least a portion of a first common region 651 of the first image 611 and the second image 621. For example, the first ROI may include a leftmost side of the front-side view image, and a second ROI may include an uppermost side of the left-side view image. Similarly, ROIs may be set such that the ROIs includes at least a portion of a second common region 652 of the second image 621 and the third image 631. ROIs may be set such that the ROIs includes at least a portion of a third common region 653 of the third image 631 and the fourth image 641. ROIs may be set such that the fourth ROI includes at least a portion of a fourth common region 654 of the fourth image 641 and the first image 611.

Figure 7:
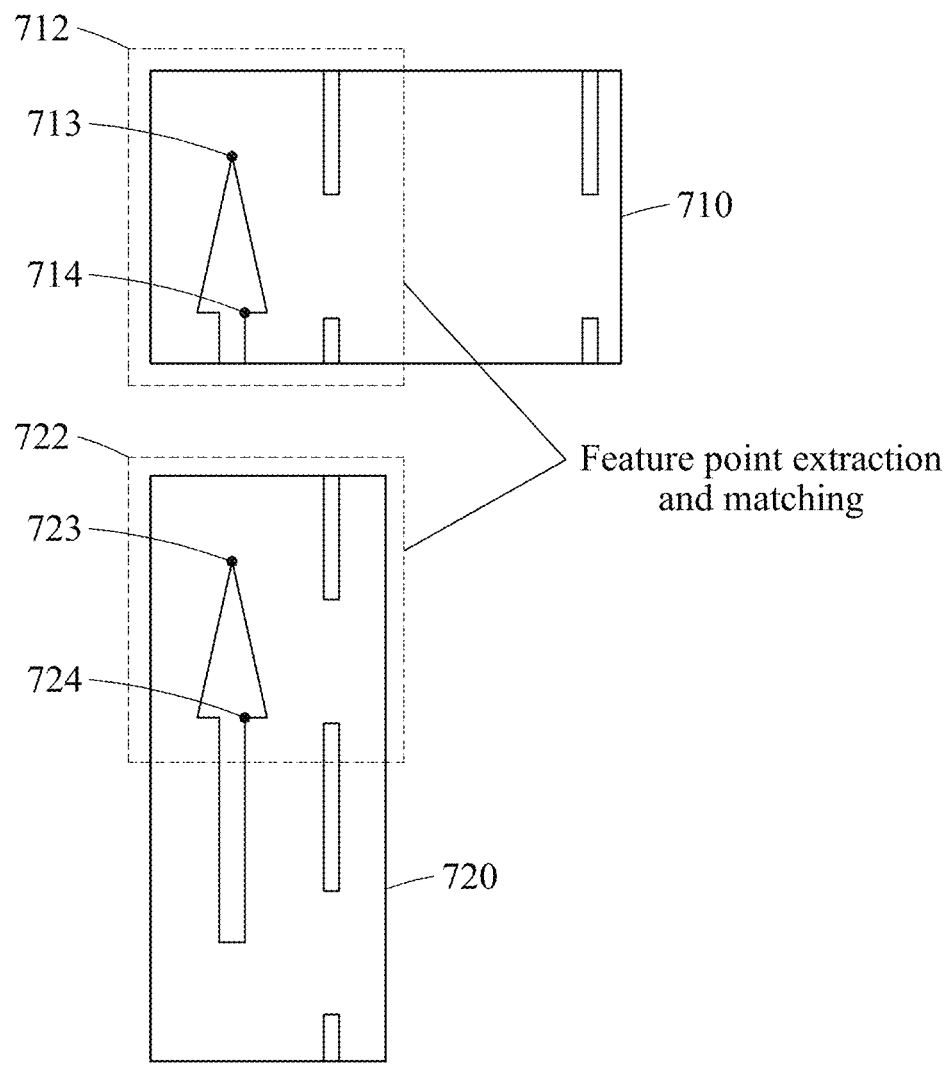
FIG. 7 is a diagram illustrating an example of a method of extracting and matching feature points according to an example embodiment.

FIG. 7 is a diagram illustrating an example of a method of extracting and matching feature points according to an example embodiment.

Referring to FIG. 7, a first ROI 712 may be set in a front-side view image 710 and a second ROI 722 may be set in a left-side view image 720. The electronic device 400 may generate partial images by cropping the set ROIs 712 and 722.

Based on the set ROIs 712 and 722 or the generated partial images, one or more feature points 713, 714, 723, and 724 of the ROIs 712 and 722 may be detected. Although only some feature points of direction markings are illustrated for the convenience of description, a plurality of other feature points may be detected based on a text and an edge of an image.

The electronic device 400 may match the detected feature points. For example, the feature point 713 of the first ROI 712 may match the feature point 723 of the second ROI 722, and the feature point 714 of the first ROI 712 may match the feature point 724 of the second ROI 722.

To match the feature points, various algorithms such as a SIFT algorithm, a SURF algorithm, a Haar algorithm, a Ferns algorithm, and an ORB algorithm may be used, but not limited thereto.

Figure 8:
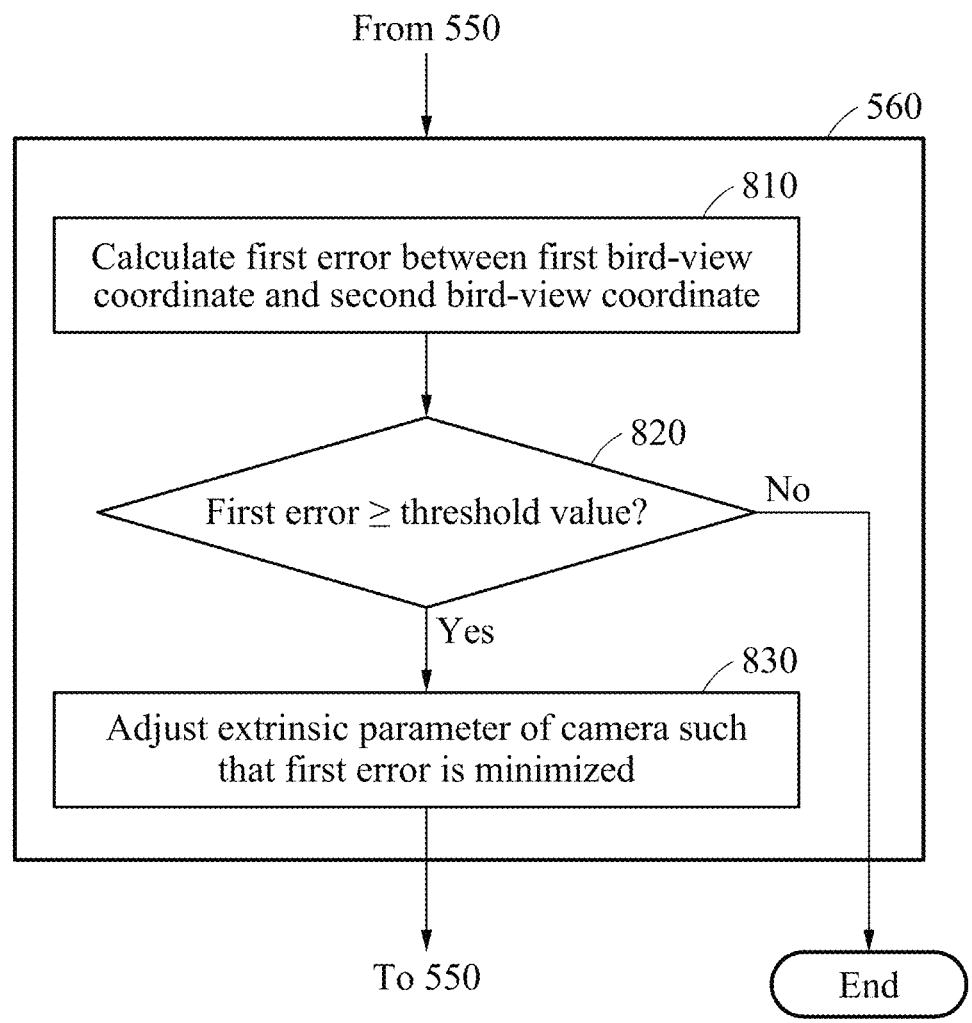
FIG. 8 is a flowchart illustrating an example of a method of calibrating a plurality of cameras by adjusting an extrinsic parameter of each of the cameras according to an example embodiment.

FIG. 8 is a flowchart illustrating an example of a method of calibrating a plurality of cameras by adjusting an extrinsic parameter of each of cameras according to an example embodiment.

Operation 560 described above with reference to FIG. 5 may include operations 810 through 830 to be described hereinafter with reference to FIG. 8.

Referring to FIG. 8, in operation 810, the electronic device 400 calculates a first error between the first bird-view coordinate and the second bird-view coordinate. When an extrinsic parameter of each of the cameras is set or adjusted accurately, the first bird-view coordinate and the second bird-view coordinate may be indicated the same, and thus the first error may be 0 or a value close to 0.

The first bird-view coordinate and the second bird-view coordinate may be associated with a pair of matching feature points. For example, when there is a plurality of pairs of matching feature points, an error may be calculated for each of the pairs.

In operation 820, the electronic device 400 determines whether the first error is greater than or equal to a preset threshold value. When the first error is less than the threshold value, the camera calibration for calibrating the cameras may be terminated. However, when one of errors does not satisfy such a condition described in the foregoing even though another error of the errors satisfies the condition, the camera calibration may be performed continuously.

In operation 830, when the first error is greater than or equal to the threshold value, the electronic device 400 adjusts an extrinsic parameter of at least one of the cameras such that the first error is minimized. For example, the electronic device 400 may adjust at least one of rotation information or position information of the camera.

According to an example embodiment, based on a plurality of errors, a cause of occurrence of the errors may be determined. The cause may include, for example, inaccurate rotation information of a left camera. To solve such a cause, at least one of rotation information or position information of a camera may be adjusted. For example, the rotation information of the left camera may be adjusted. To determine such a cause, various methods may be used, and the methods may not be limited to a specific one.

For example, for the camera calibration, a Levenberg-Marquardt algorithm and a gradient descent algorithm may be used.

Figure 9:
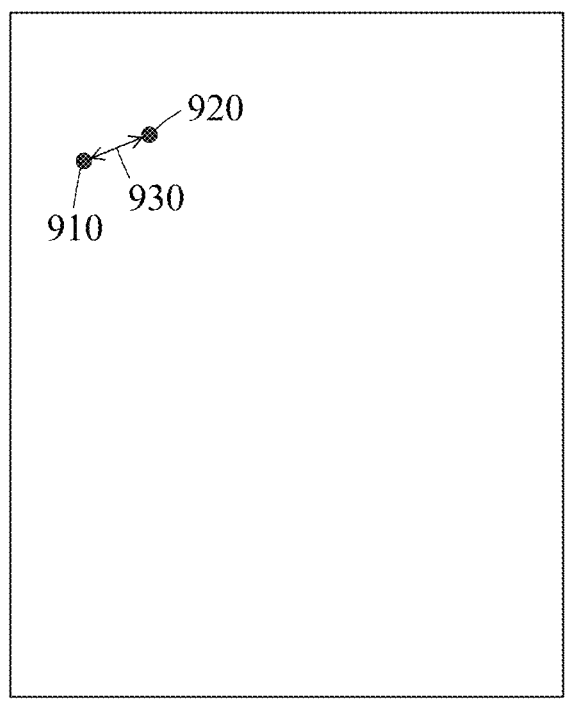
FIG. 9 is a diagram illustrating an example of an error between bird-view coordinates of matching feature points according to an example embodiment.

FIG. 9 is a diagram illustrating an example of an error between bird-view coordinates of matching feature points according to an example embodiment.

When the feature point 713 and the feature point 723 match each other as illustrated in FIG. 7, a first bird-view coordinate 910 of the feature point 713 and a second bird-view coordinate 920 of the feature point 723 may be calculated.

When an extrinsic parameter of each of cameras is accurate, the first bird-view coordinate 910 and the second bird-view coordinate 920 may have a same coordinate in a world coordinate system. However, when the extrinsic parameter is not accurate, the first bird-view coordinate 910 and the second bird-view coordinate 920 may have different coordinates in the world coordinate system.

When accuracy of the extrinsic parameter decreases, a first error 930 between the first bird-view coordinate 910 and the second bird-view coordinate 920 may increase. The first error 930 may be calculated as a distance therebetween. When the accuracy of the extrinsic parameter increases through adjustment, the first error 930 may decrease.

Figure 10:
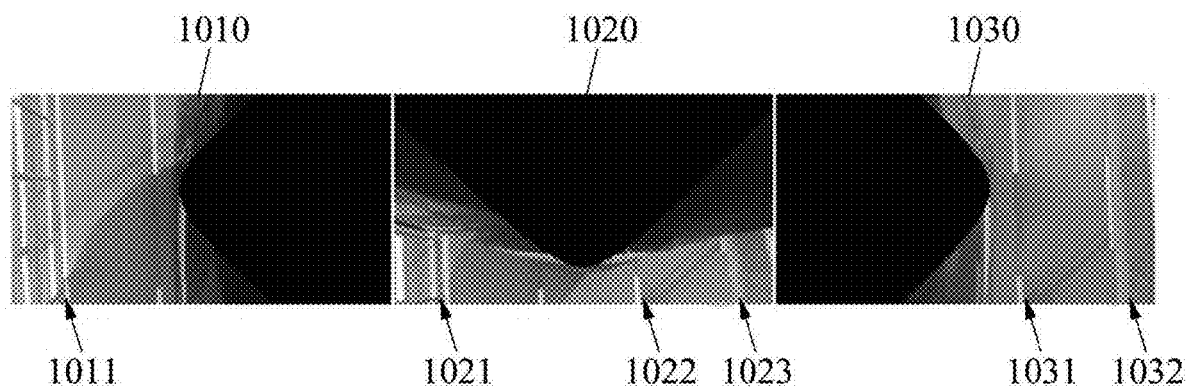
FIG. 10 illustrates examples of partial bird-view images generated when a plurality of cameras are desirably calibrated according to an example embodiment.

FIG. 10 illustrates examples of partial bird-view images generated when a plurality of cameras are desirably calibrated according to an example embodiment.

Referring to FIG. 10, a feature point 1011 in a first partial bird-view image 1010 of a left-side view image may match a feature point 1021 in a second partial bird-view image 1020 of a rear-side view image, and feature points 1022 and 1023 in the second partial bird-view image 1020 may respectively match feature points 1031 and 1032 in a third partial bird-view image 1030.

When a plurality of cameras are desirably calibrated, a coordinate of the feature point 1011 and a coordinate of the feature point 1021 may correspond to or match each other, for example, they may be the same or almost the same, in a world coordinate system. Similarly, coordinates of the feature points 1022 and 1023 and coordinates of the feature points 1031 and 1032 may correspond to or match each other, for example, they may be the same or almost the same, in the world coordinate system.

Figure 11:
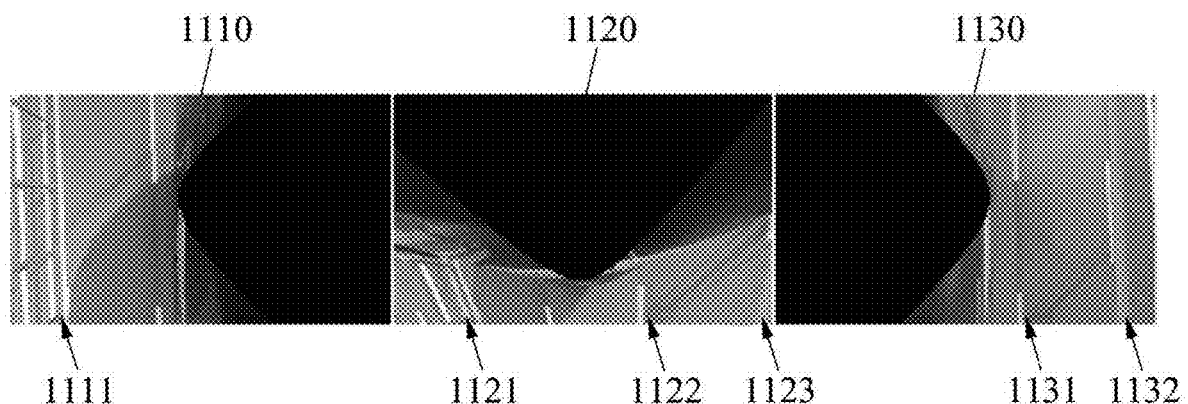
FIG. 11 illustrates examples of partial bird-view images generated when a plurality of cameras are not desirably calibrated according to an example embodiment.

FIG. 11 illustrates examples of partial bird-view images generated when a plurality of cameras are not desirably calibrated according to an example embodiment.

Referring to FIG. 11, a feature point 1111 in a first partial bird-view image 1110 of a left-side view image may match a feature point 1121 in a second partial bird-view image 1120 of a rear-side view image, and feature points 1122 and 1123 in the second partial bird-view image 1110 may respectively match feature points 1131 and 1132 in a third partial bird-view image 1130 of a right-side view image.

When a plurality of cameras are not desirably calibrated, a coordinate of the feature point 1111 and a coordinate of the feature point 1121 may not correspond to or match each other in a world coordinate system. Similarly, coordinates of the feature points 1122 and 1123 and coordinates of the feature points 1131 and 1132 may not correspond to or match each other in the world coordinate system.

Even when the coordinate of the feature point 1111 and the coordinate of the feature point 1121 correspond to or match each other, the coordinates of the feature points 1122 and 1123 and the feature points 1131 and 1132 may not correspond to or match each other. In such a case, an extrinsic parameter of each of cameras may be adjusted such that the coordinates of the feature points 1122 and 1123 and the feature points 1131 and 1132 correspond to or match each other.

Figure 12:
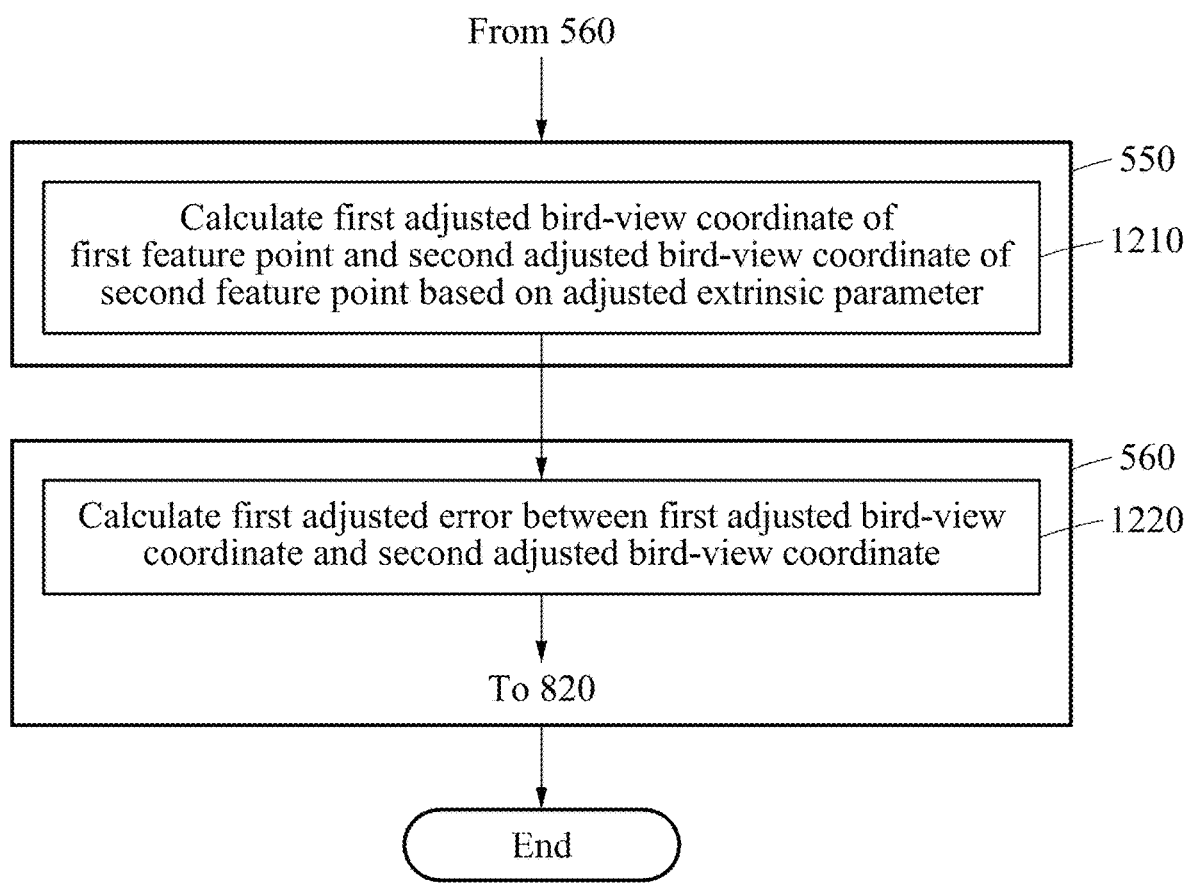
FIG. 12 is a flowchart illustrating an example of a method of calculating an adjusted error between bird-view coordinates based on an adjusted extrinsic parameter according to an example embodiment.

FIG. 12 is a flowchart illustrating an example of a method of calculating an adjusted error between bird-view coordinates based on an adjusted extrinsic parameter according to an example embodiment.

After operation 560 described above with reference to FIG. 5 is performed, operation 550 described above with reference to FIG. 5 may be performed again. That is, by performing repeatedly operations 550 and 560, it is possible to calibrate a plurality of cameras.

Operation 550 may further include operation 1210 to be described hereinafter with reference to FIG. 12. In operation 1210, the electronic device 400 calculates a first adjusted bird-view coordinate of the first feature point and a second adjusted bird-view coordinate of the second feature point based on the adjusted extrinsic parameter.

Operation 560 may further include operation 1220 to be described hereinafter with reference to FIG. 12. In operation 1220, the electronic device 400 calculates a first adjusted error between the first adjusted bird-view coordinate and the second adjusted bird-view coordinate.

Operation 1220 may correspond to operation 810 described above with reference to FIG. 8, and operations 820 and 830 described above with reference to FIG. 8 may be performed after operation 1220 is performed.

Figure 13:
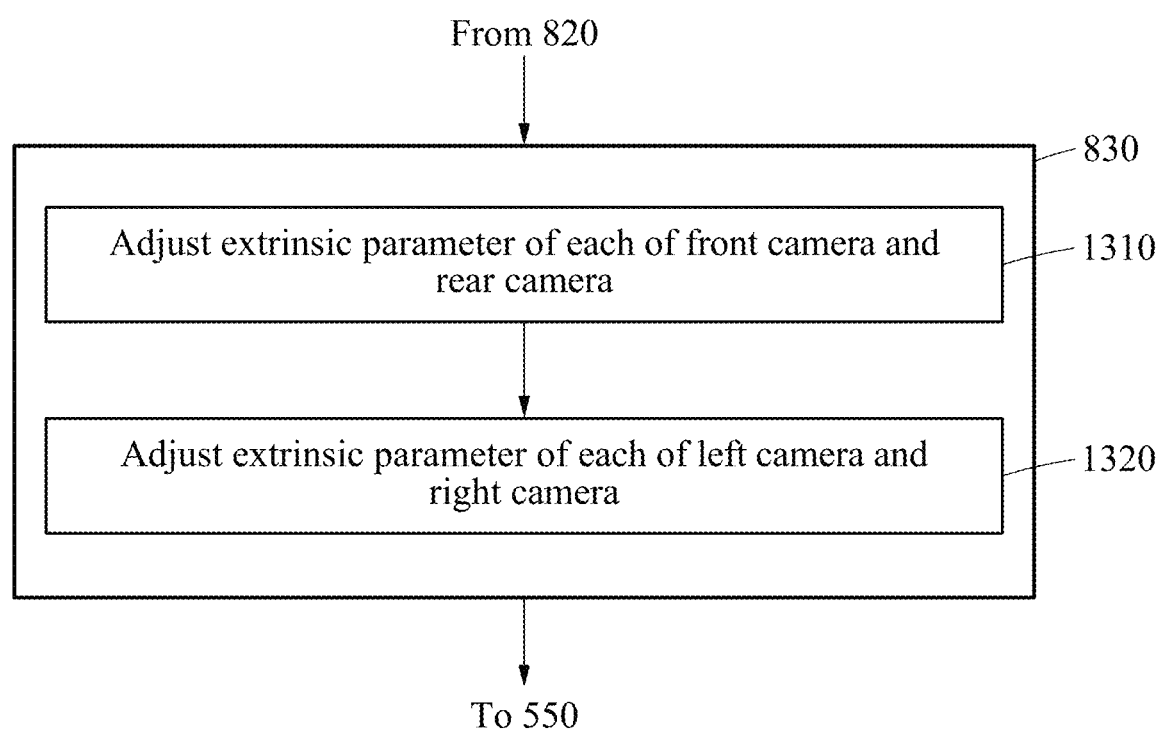
FIG. 13 is a flowchart illustrating an example of a method of adjusting an extrinsic parameter of a camera such that an error is minimized according to an example embodiment.

FIG. 13 is a flowchart illustrating an example of a method of adjusting an extrinsic parameter of a camera such that an error is minimized according to an example embodiment.

Operation 830 described above with reference to FIG. 8 may include operations 1310 and 1320 to be described hereinafter with reference to FIG. 13.

Referring to FIG. 13, in operation 1310, the electronic device 400 adjusts an extrinsic parameter of each of a front camera and a rear camera.

In operation 1320, the electronic device 400 adjusts an extrinsic parameter of each of a left camera and a right camera.

An example of a method of extracting and matching feature points from images which are not bird-view images but, for example, fish-eye images, and transforming matching feature points by a bird's eye viewpoint, is described above with reference to FIGS. 5 through 13.

Hereinafter, an example of a method of transforming a portion of an image which is not a bird-view image but, for example, a fish-eye image, into a bird-view image, extracting feature points from partial bird-view images, and matching the extracted feature points will be described with reference to FIGS. 14 through 18.

Figure 14:
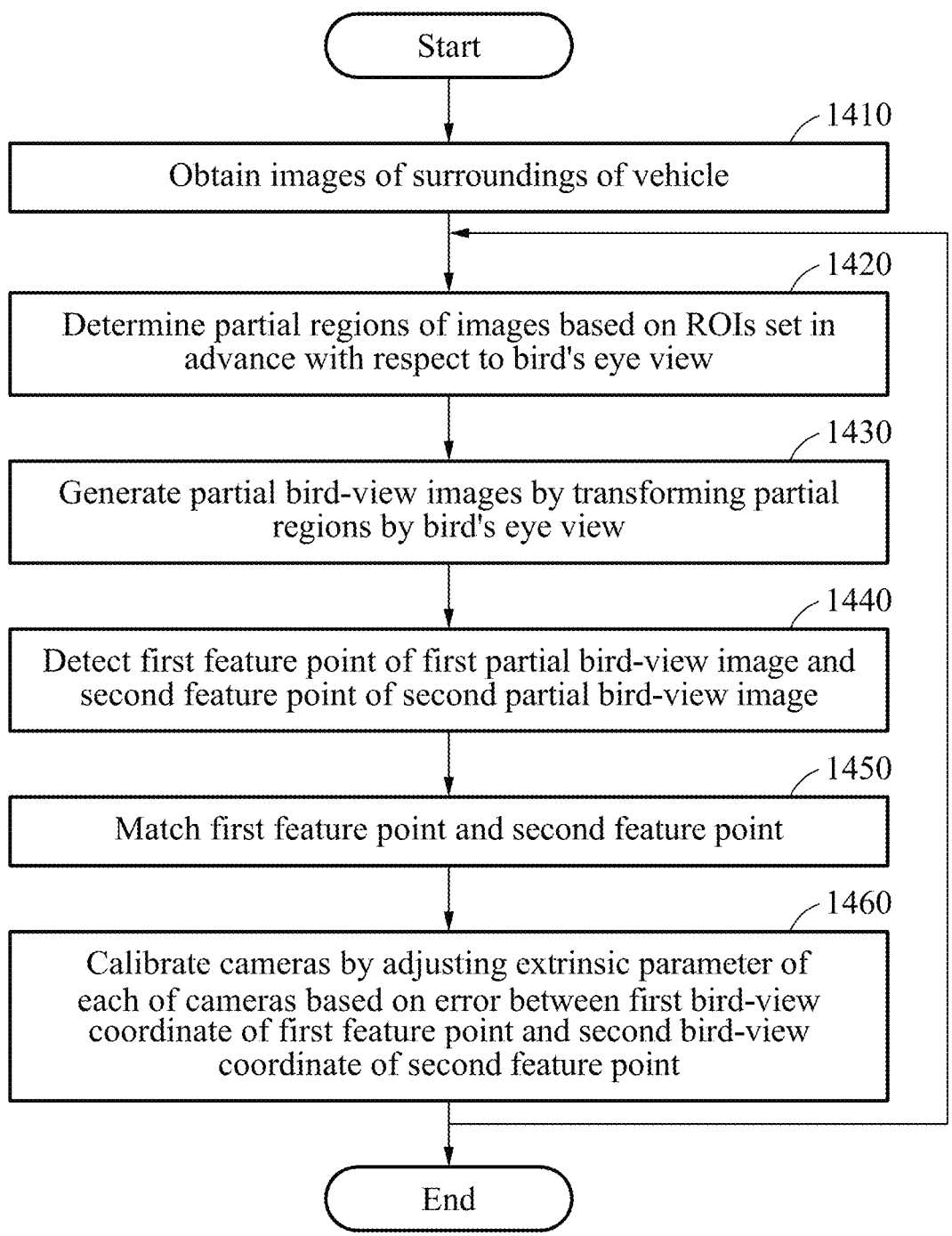
FIG. 14 is a flowchart illustrating an example of a method of calibrating a plurality of cameras according to another example embodiment.

FIG. 14 is a flowchart illustrating an example of a method of calibrating a plurality of cameras according to another example embodiment. The method of calibrating a plurality of cameras may also be referred to herein simply as a camera calibration method.

Operations 1410 through 1460 to be described hereinafter with reference to FIG. 14 may be performed by the electronic device 400 described above with reference to FIG. 4.

Referring to FIG. 14, in operation 1410, the electronic device 400 obtains a plurality of images of surroundings of a vehicle. The obtained images may be images captured using a fish-eye lens.

For a more detailed description of operation 1410, reference may be made to the description of operation 510 provided above with reference to FIG. 5.

In operation 1420, the electronic device 400 determines a partial region of each of the images based on an ROI set in advance with respect to a bird's eye viewpoint. For example, a region corresponding to a front left side of an entire bird-view image to be generated may be preset as a first ROI, and a region of a front-side view image corresponding to the first ROI may be determined to be a partial region. For another example, a region corresponding to a front left side of an entire bird-view image to be generated may be preset as a second ROI, and a region of a left-side view image corresponding to the second ROI may be determined to be a partial region. The first ROI, the second ROI, and the partial regions respectively corresponding to the first ROI and the second ROI will be described hereinafter in detail with reference to FIGS. 15 and 16.

In operation 1430, the electronic device 400 generates a plurality of partial bird-view images by transforming the determined partial regions of the images by the bird's eye viewpoint. The partial regions of the images determined in operation 1420 may be images captured using a fish-eye lens, and thus shapes in the images may be distorted. By transforming the partial regions by the bird's eye viewpoint, it is possible to restore the shapes in the images. A partial bird-view image will be described hereinafter in detail with reference to FIG. 17.

In operation 1440, the electronic device 400 detects a first feature point of a first partial bird-view image and a second feature point of a second partial bird-view image. For example, a feature point on a pattern positioned on a road may be detected. To detect feature points, various algorithms, for example, a SIFT algorithm, a SURF algorithm, a Haar algorithm, a Ferns algorithm, and an ORB algorithm, may be used, but not be limited thereto.

In operation 1450, the electronic device 400 matches the first feature point and the second feature point. For example, the electronic device 400 may match the first feature point of the first partial bird-view image of a front side and the second feature point of the second partial bird-view image of a left side. For another example, the electronic device 400 may match the first feature point of the first partial bird-view image of a left side and the second feature point of the second partial bird-view image of a rear side. When the images captured using a fish-eye lens are transformed into bird-view images, accuracy in matching feature points in ROIs for same features may increase.

In operation 1460, the electronic device 400 calibrates a plurality of cameras by adjusting an extrinsic parameter of each of the cameras based on an error between a first bird-view coordinate of the first feature point and a second bird-view coordinate of the second feature point.

For a more detailed description of operation 1460, reference may be made to the description of operation 560 provided above with reference to FIG. 5.

As a prerequisite for performing operation 560, whether the number of matching feature points is greater than or equal to a preset number may be determined after operation 550 described above with reference to FIG. 5 is performed. For example, when the number of matching feature points of the first partial bird-view image and the second partial bird-view image is greater than or equal to the preset number, camera calibration may be performed. When the number of matching feature points increases, an extrinsic parameter may be estimated more accurately.

However, when the number of the matching feature points of the first partial bird-view image and the second partial bird-view image is less than the preset number, accuracy in adjusting the extrinsic parameter may not be guaranteed, and thus the extrinsic parameter may not be adjusted for a plurality of current images, for example, current frames.

Hereinafter, the camera calibration method will be described in greater detail with reference to FIG. 18.

Figure 15:
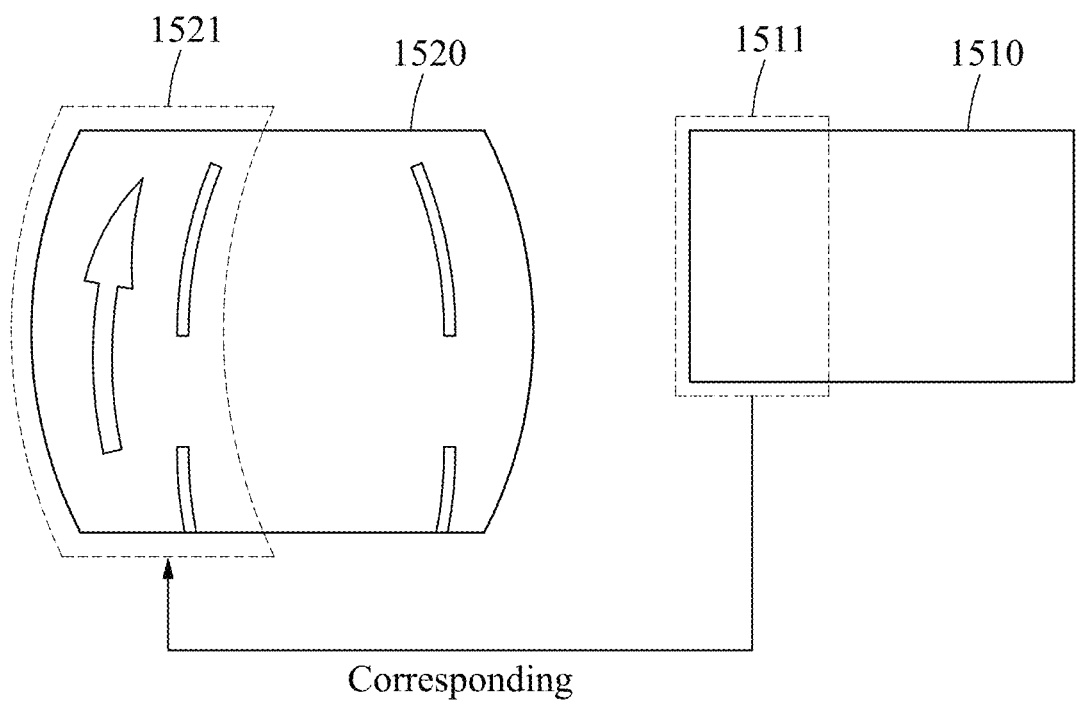
FIGS. 15 and 16 are diagrams illustrating examples of a partial region of an image determined based on a preset ROI in a bird-view image according to an example embodiment.
Figure 16:
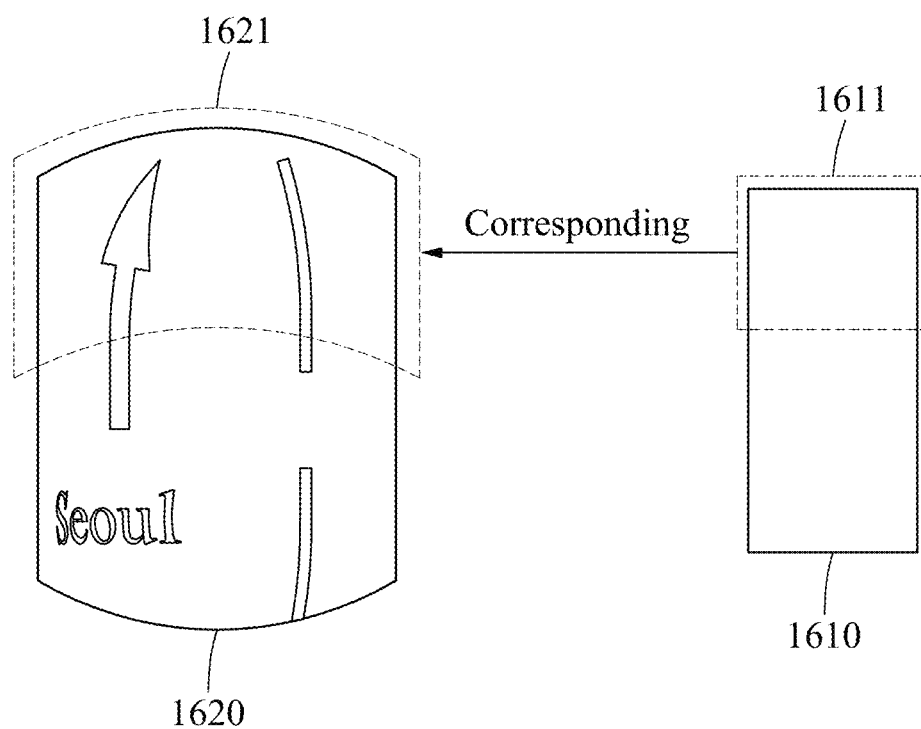

FIGS. 15 and 16 are diagrams illustrating examples of a partial region of an image determined based on a preset ROI in a bird-view image according to an example embodiment.

A right portion of FIG. 15 illustrates a front region 1510 of an entire bird-view image, and a portion of the front region 1510 may be set in advance as an ROI 1511.

A left portion of FIG. 15 illustrates a front-side view image 1520 among a plurality of images, and the front-side view image 1520 may be an image captured using a fish-eye lens. A partial region 1521 of the front-side view image 1520 that corresponds to the ROI 1511 may be determined. For example, the partial region 1521 corresponding to the ROI 1511 may be determined based on an extrinsic parameter of a front camera. When the extrinsic parameter of the front camera is adjusted, the partial region 1521 corresponding to the ROI 1511 may change.

Similarly, a right portion of FIG. 16 illustrates a left region 1610 of an entire bird-view image, and a portion of the left region 1610 may be set in advance as an ROI 1611.

A left portion of FIG. 16 illustrates a left-side view image 1620 among a plurality of images, and the left-side view image 1620 may be an image captured using a fish-eye lens. A partial region 1621 of the left-side view image 1620 that corresponds to the ROI 1611 may be determined. For example, the partial region 1621 corresponding to the ROI 1611 may be determined based on an extrinsic parameter of a left camera. When the extrinsic parameter of the left camera is adjusted, the partial region 1621 corresponding to the ROI 1611 may change.

In such a relationship between the ROI 1511 and the ROI 1611, the ROI 1511 may be referred to herein as a first ROI and the ROI 1611 may be referred to herein as a second ROI.

Figure 17:
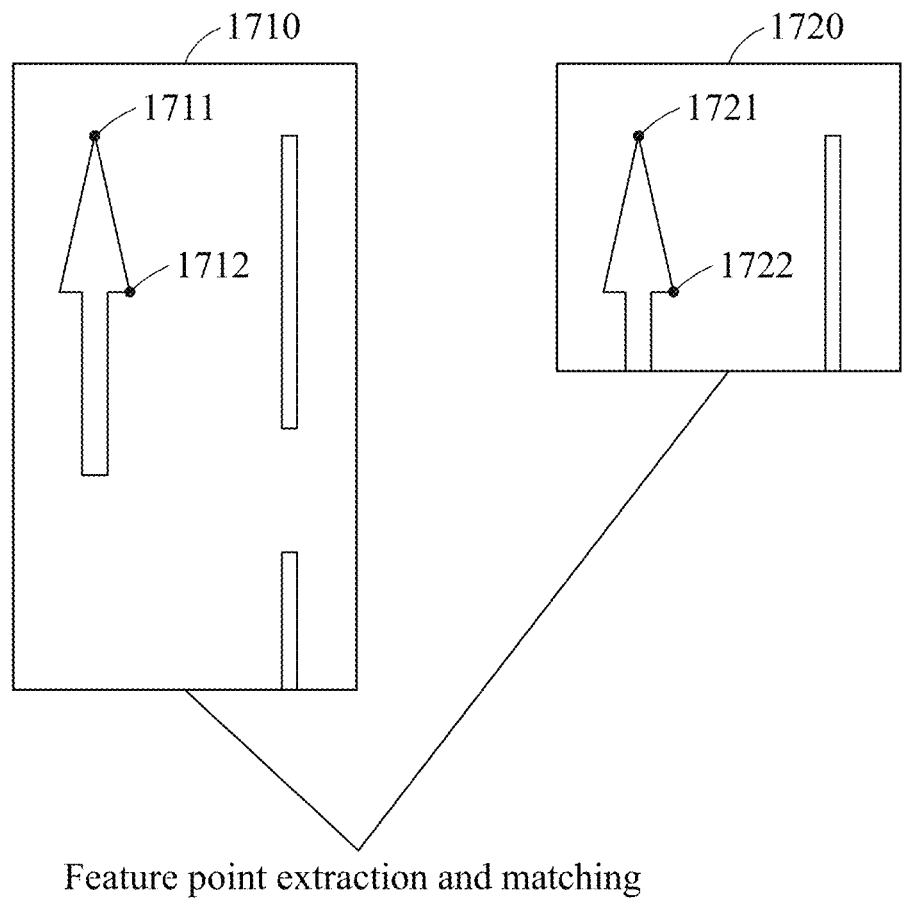
FIG. 17 is a diagram illustrating an example of a method of extracting and matching feature points of partial bird-view images according to an example embodiment.

FIG. 17 is a diagram illustrating an example of a method of extracting and matching feature points of partial bird-view images according to an example embodiment.

Referring to FIG. 17, the partial region 1521 of FIG. 15 and the partial region 1621 of FIG. 16 may be transformed into a first partial bird-view image 1710 and a second partial bird-view image 1720, respectively. The first partial bird-view image 1710 and the second partial bird-view image 1720 may be images from a bird's eye viewpoint.

One or more feature points 1711 and 1712 of the first partial bird-view image 1710 may be extracted. One or more feature points 1721 and 1722 of the second partial bird-view image 1720 may be extracted. The feature point 1711 may match the feature point 1721, and the feature point 1712 may match the feature point 1722.

Figure 18:
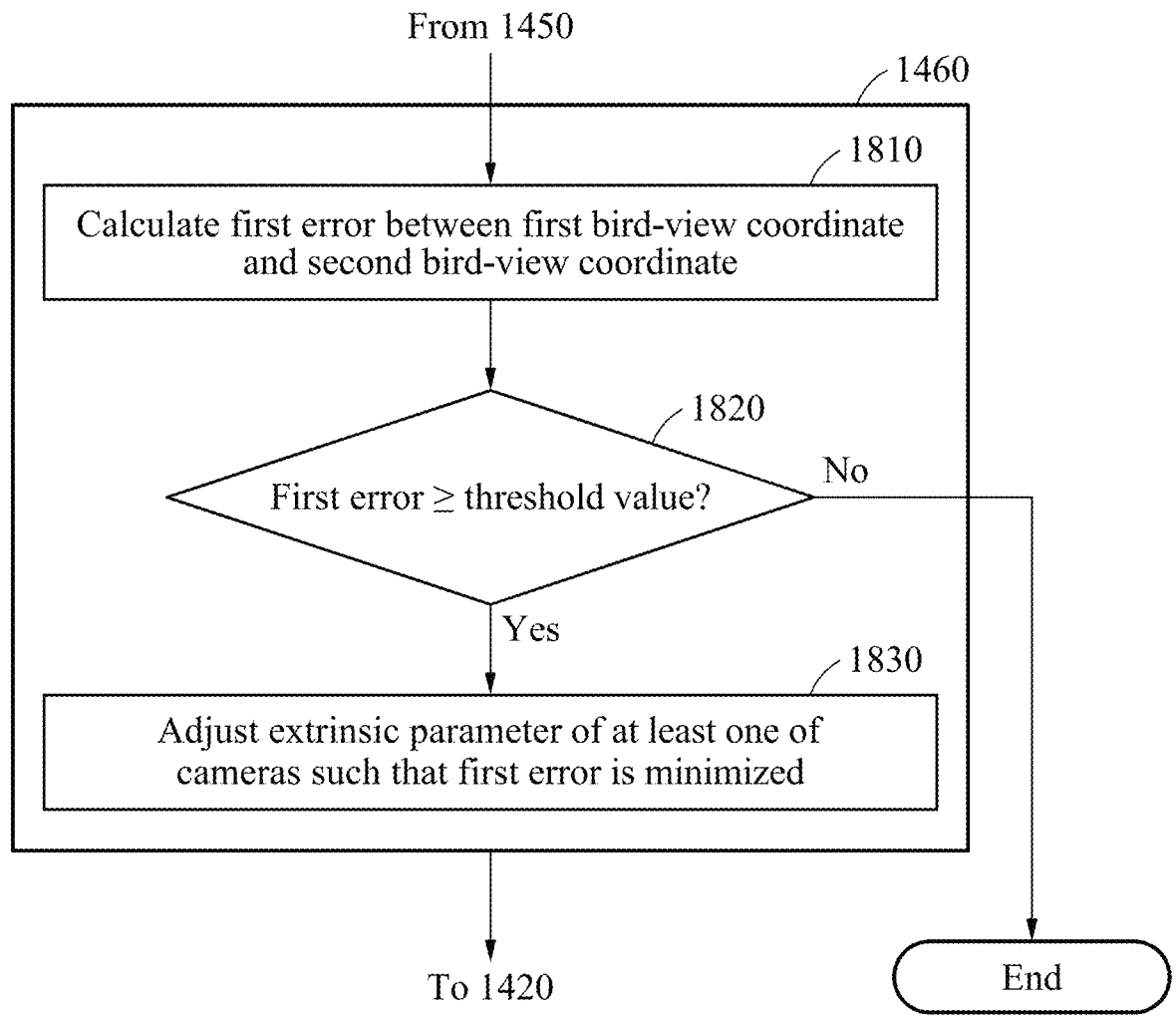
FIG. 18 is a flowchart illustrating an example of a method of calibrating a plurality of cameras by adjusting an extrinsic parameter of each of the cameras based on an error between a first bird-view coordinate and a second bird-view coordinate according to an example embodiment.

FIG. 18 is a flowchart illustrating an example of a method of calibrating a plurality of cameras by adjusting an extrinsic parameter of each of the cameras based on an error between a first bird-view coordinate and a second bird-view coordinate according to an example embodiment.

Operation 1460 described above with reference to FIG. 14 may include operations 1810 through 1830 to be described hereinafter with reference to FIG. 18.

Referring to FIG. 18, in operation 1810, the electronic device 400 calculates a first error between the first bird-view coordinate and the second bird-view coordinate. When an extrinsic parameter of a camera is accurately set or adjusted, the first bird-view coordinate and the second bird-view coordinate may be indicated the same, and thus the first error may be 0 or a value close to 0.

The first bird-view coordinate and the second bird-view coordinate may be associated with a pair of matching feature points. When there is a plurality of pairs of matching feature points, an error may be calculated for each of the pairs.

In operation 1820, the electronic device 400 determines whether the first error is greater than or equal to a preset threshold value. When the first error is less than the threshold value, camera calibration for calibrating a plurality of cameras may be terminated. However, when one of errors does not satisfy such a condition described in the foregoing even though another error of the errors satisfies the condition, the camera calibration may be performed continuously.

In operation 1830, when the first error is greater than or equal to the threshold value, the electronic device 400 adjusts an extrinsic parameter of at least one of the cameras such that the first error is minimized. For example, the electronic device 400 may adjust at least one of rotation information or position information of the camera.

According to an example embodiment, based on a plurality of errors, a cause of occurrence of the errors may be determined. The cause may include, for example, inaccurate rotation information of a left camera. To solve such a cause, at least one of rotation information or position information of a camera may be adjusted. For example, the rotation information of the left camera may be adjusted. To determine such a cause, various methods may be used, and the methods may not be limited to a specific one.

For example, for the camera calibration, a Levenberg-Marquardt algorithm and a gradient descent algorithm may be used.

According to an example embodiment described herein, there is provided a method and device for calibrating a plurality of cameras.

According to another example embodiment described herein, there is provided a method and device for calibrating a plurality of cameras while a vehicle is traveling. The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A camera calibration method to be performed by a processor provided in a vehicle while the vehicle is driving, comprising:

obtaining a plurality of images of surroundings of the vehicle captured by a plurality of cameras of the vehicle while driving on a road;

setting a region of interest (ROI) in each of the images, wherein a first ROI of a first image among the images and a second ROI of a second image among the images include a common region;

detecting one or more feature points of the set ROIs, wherein the feature points are associated with an object on the road;

matching one or more first feature points of the first ROI and one or more second feature points of the second ROI based on the detected feature points;

calculating a first bird-view coordinate of the first feature points and a second bird-view coordinate of the second feature points when a number of matching feature points for the first ROI and the second ROI is greater than or equal to a preset number;

calculating a first error between the first bird-view coordinate and the second bird-view coordinate; and calibrating the cameras by adjusting an extrinsic parameter of at least one of the plurality of such that the first error is minimized, wherein the calculating the first bird-view coordinate of the first feature points and the second bird-view coordinate of the second feature points comprises:

when the extrinsic parameter of the at least one of the cameras is adjusted, calculating a first adjusted bird-view coordinate of the first feature points and a second adjusted bird-view coordinate of the second feature points based on the adjusted extrinsic parameter, wherein the calibrating of the cameras comprises:
calculating a first adjusted error between the first adjusted bird-view coordinate and the second adjusted bird-view coordinate; and
when the first error is less than a preset threshold value, terminating the calibrating of the cameras.

2. The camera calibration method of claim 1, wherein the cameras include at least two of a left camera configured to capture an image of a left-side view from the vehicle, a right camera configured to capture an image of a right-side view from the vehicle, a front camera configured to capture an image of a front-side view from the vehicle, or a rear camera configured to capture an image of a rear-side view from the vehicle.

3. The camera calibration method of claim 1, wherein the extrinsic parameter of each of the cameras includes rotation information and position information of each of the cameras.

4. The camera calibration method of claim 1, further comprising:
generating partial images by cropping the set ROIs,
wherein the detecting of the feature points of the ROIs comprises:
detecting the one or more feature points of the ROIs based on the generated partial images.

5. A non-transitory computer-readable storage medium storing instructions that, when executed by a processor, cause the processor to perform the camera calibration method of claim 1.

6. An electronic device provided in a vehicle to calibrate a plurality of cameras, comprising:
a memory in which a program of calibrating the cameras is recorded; and
a processor configured to perform the program,
wherein the program comprises:
obtaining a plurality of images of surroundings of the vehicle captured by the cameras of the vehicle while driving on a road;
setting a region of interest (ROI) in each of the images, wherein a first ROI of a first image among the images and a second ROI of a second image among the images include a common region;
detecting one or more feature points of the set ROIs, wherein the feature points are associated with an object on the road;
matching one or more first feature points of the first ROI and one or more second feature points of the second ROI based on the detected feature points;
calculating a first bird-view coordinate of the first feature points and a second bird-view coordinate of the second feature points when a number of matching feature points for the first ROI and the second ROI is greater than or equal to a preset number;
calculating a first error between the first bird-view coordinate and the second bird-view coordinate;
calibrating the cameras by adjusting an extrinsic parameter of at least one of the plurality of such that the first error is minimized,
wherein the calculating the first bird-view coordinate of the first feature points and the second bird-view coordinate of the second feature points comprises:
when the extrinsic parameter of the at least one of the cameras is adjusted, calculating a first adjusted bird-view coordinate of the first feature points and a second adjusted bird-view coordinate of the second feature points based on the adjusted extrinsic parameter, wherein the calibrating of the cameras comprises:
calculating a first adjusted error between the first adjusted bird-view coordinate and the second adjusted bird-view coordinate; and
when the first error is less than a preset threshold value, terminating the calibrating of the cameras.

7. The electronic device of claim 6, wherein the program further comprises:
generating partial images by cropping the set ROIs,
wherein the detecting of the feature points of the ROIs comprises:
detecting the feature points of the ROIs based on the generated partial images.

8. A camera calibration method to be performed by a processor provided in a vehicle, comprising:
obtaining a plurality of images of surroundings of the vehicle captured by a plurality of cameras of the vehicle while driving on a road;
determining a partial region of each of the images based on a region of interest (ROI) that is set in advance with respect to a bird's eye viewpoint;
generating a plurality of partial bird-view images by transforming the determined partial regions by the bird's eye viewpoint, wherein a first partial bird-view image among the partial bird-view images corresponds to a first ROI and a second partial bird-view image among the partial bird-view images corresponds to a second ROI, and the first ROI and the second ROI include a common region;
detecting one or more first feature points of the first partial bird-view image and one or more second feature points of the second partial bird-view image, wherein the first feature points and the second feature points are associated with an object on the road;
matching the first feature points and the second feature points;
calculating a first error between a first bird-view coordinate of the matching first feature points and a second bird-view coordinate of the matching second feature points when a number of matching feature points for the first ROI and the second ROI is greater than or equal to a preset number; and
calibrating the plurality of cameras by adjusting an extrinsic parameter of at least one of the plurality of cameras such that the first error is minimized.

9. The camera calibration method of claim 8, wherein the cameras include at least two of a left camera configured to capture an image of a left-side view from the vehicle, a right camera configured to capture an image of a right-side view from the vehicle, a front camera configured to capture an image of a front-side view from the vehicle, or a rear camera configured to capture an image of a rear-side view from the vehicle.

10. A non-transitory computer-readable storage medium storing instructions that, when executed by a processor, cause the processor to perform the camera calibration method of claim 8.

11. An electronic device provided in a vehicle to calibrate a plurality of cameras, comprising:
a memory in which a program of calibrating the cameras is recorded; and a processor configured to perform the program,
wherein the program comprises:
- obtaining a plurality of images of surroundings of the vehicle captured by the cameras of the vehicle while driving on a road;
- determining a partial region of each of the images based on a region of interest (ROI) that is set in advance with respect to a bird's eye viewpoint;
- generating a plurality of partial bird-view images by transforming the determined partial regions by the bird's eye viewpoint, wherein a first partial bird-view image among the partial bird-view images corresponds to a first ROI and a second partial bird-view image among the partial bird-view images corresponds to a second ROI, and the first ROI and the second ROI include a common region;
- detecting one or more first feature points of the first partial bird-view image and one or more second feature points of the second partial bird-view image, wherein the first feature points and the second feature points are associated with an object on the road;
- matching the first feature points and the second feature points;
- calculating a first error between a first bird-view coordinate of the matching first feature points and a second bird-view coordinate of the matching second feature points when a number of matching feature points for the first ROI and the second ROI is greater than or equal to a preset number; and
- calibrating the plurality of cameras by adjusting an extrinsic parameter of at least one of the plurality of cameras such that the first error is minimized.

* * * * *